US012770919B2

(12) United States Patent
Nam et al.

(10) Patent No.: US 12,770,919 B2
(45) Date of Patent: Oct. 20, 2026

(54) POLYMER SOLID ELECTROLYTE AND METHOD FOR MANUFACTURING SAME

(71) Applicant: LG Energy Solution, Ltd., Seoul (KR)

(72) Inventors: Sunghyun Nam, Daejeon (KR); Hyeaeun Han, Daejeon (KR); Dong Kyu Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 422 days.

(21) Appl. No.: 18/688,271

(22) PCT Filed: May 31, 2023

(86) PCT No.: PCT/KR2023/007471
§ 371 (c)(1),
(2) Date: Feb. 29, 2024

(87) PCT Pub. No.: WO2023/234710
PCT Pub. Date: Dec. 7, 2023

(65) Prior Publication Data

US 2025/0132385 A1 Apr. 24, 2025

(30) Foreign Application Priority Data

May 31, 2022 (KR) ........................ 10-2022-0067060
May 31, 2023 (KR) ........................ 10-2023-0070074

(51) Int. Cl.
*H01M 10/0565* (2010.01)
*C08J 5/22* (2006.01)
(Continued)

(52) U.S. Cl.
CPC ........... *H01M 10/0565* (2013.01); *C08J 5/22* (2013.01); *H01M 10/052* (2013.01);
(Continued)

(58) Field of Classification Search
CPC .... C08J 5/22; H01M 10/052; H01M 10/0564; H01M 10/0565; H01M 2300/0082; Y02E 60/10
See application file for complete search history.

(56) References Cited

U.S. PATENT DOCUMENTS

2015/0099197 A1 4/2015 Nakashima et al.
2015/0155594 A1 6/2015 Lee et al.
(Continued)

FOREIGN PATENT DOCUMENTS

CN 106018488 B 2/2019
CN 110540727 A 12/2019
(Continued)

OTHER PUBLICATIONS

Li Chen, "A PVA/LiCl/PEO Interpenetrating Composite Electrolyte with a Three-Dimensional Dual-Network for All-Solid-State Flexible Aluminum-Air Batteries," Royal Society of Chemistry, RSC Adv., 2021, 11, pp. 39476-39483.
(Continued)

*Primary Examiner* — Lingwen R Zeng
(74) *Attorney, Agent, or Firm* — Bryan Cave Leighton Paisner LLP

(57) ABSTRACT

A polymer solid electrolyte and a method for preparing the same are provided. The method includes preparing a polymer solid electrolyte, defining a correlation between an added amount of a lithium salt and ionic conductivity of the polymer solid electrolyte, and adjusting the added amount of the lithium salt depending on the ionic conductivity of the prepared solid electrolyte, and is thereby capable of preparing a polymer solid electrolyte having high ionic conductivity through a large-capacity continuous process.

13 Claims, 2 Drawing Sheets

(51) Int. Cl.
*H01M 10/052* (2010.01)
*H01M 10/0564* (2010.01)

(52) U.S. Cl.
CPC .................. *H01M 10/0564* (2013.01); *H01M 2300/0082* (2013.01); *Y02E 60/10* (2013.01)

(56) References Cited

U.S. PATENT DOCUMENTS

| | | | |
|---|---|---|---|
| 2018/0254523 | A1 | 9/2018 | Ahn et al. |
| 2020/0028207 | A1 | 1/2020 | Kim et al. |

FOREIGN PATENT DOCUMENTS

| | | | | | |
|---|---|---|---|---|---|
| CN | 111668539 | A | * | 9/2020 | ........ H01M 10/0525 |
| CN | 112259788 | A | | 1/2021 | |
| CN | 110581315 | B | | 4/2021 | |
| CN | 113150314 | A | * | 7/2021 | ........ H01M 10/0525 |
| JP | 6-74344 | B2 | | 9/1994 | |
| JP | 8-217868 | A | | 8/1996 | |
| JP | 2013-058365 | A | | 3/2013 | |
| KR | 10-1627848 | B1 | | 6/2016 | |
| KR | 10-2017-0113417 | A | | 10/2017 | |
| KR | 10-1922135 | B1 | | 2/2019 | |
| KR | 10-2063159 | B1 | | 12/2019 | |
| KR | 10-2163733 | B1 | | 10/2020 | |
| WO | 2013/161765 | A1 | | 10/2013 | |

OTHER PUBLICATIONS

Juanjuan Yim, "MXene-Based Film Electrode and All-Round Hydrogel Electrolyte for Flexible All-Solid Supercapacitor with Extremely Low Working Temperature," Cell Reports Physical Science 3, 100893, May 18, 2022; pp. 1-18.

* cited by examiner

POLYMER SOLID ELECTROLYTE AND METHOD FOR MANUFACTURING SAME

CROSS-REFERENCE TO RELATED APPLICATIONS

This application is a National Phase entry pursuant to 35 U.S.C. § 371 of International Application No. PCT/KR2023/007471, filed on May 31, 2023, and claims the benefits of priorities based on Korean Patent Application No. $10^{-2022}$-0067060 filed on May 31, 2022 and Korean Patent Application No. $10^{-2023}$-0070074 filed on May 31, 2023, the disclosures of which are incorporated herein by reference in their entirety.

FIELD

The present disclosure relates to a polymer solid electrolyte and a preparation method thereof.

BACKGROUND

Since a lithium secondary battery using a liquid electrolyte has a structure in which the negative electrode and the positive electrode are partitioned by a separator, if the separator is damaged by deformation or external impact, a short circuit may occur, which may lead to dangers such as overheating or explosion. Therefore, it can be said that the development of a solid electrolyte that can secure safety in the field of the lithium secondary battery is a very important task.

A lithium secondary battery using a solid electrolyte has the advantages of increasing the safety of the battery, preventing leakage of the electrolyte solution, improving the reliability of the battery, and making it easy to manufacture a thin battery. In addition, since lithium metal can be used as a negative electrode, energy density can be improved, and it is expected to be applied to high-capacity secondary batteries for electric vehicles, in addition to small secondary batteries, and is in the limelight as a next-generation battery.

Polymer materials with ion conductivity can be used as raw materials for polymer solid electrolytes, among solid electrolytes, and hybrid materials formed by mixing polymer materials and inorganic materials are also proposed. As the inorganic material, an inorganic material such as oxide or sulfide may be used.

Such a conventional polymer solid electrolyte was prepared through a high-temperature drying process after forming a coating film. However, the conventional preparation technology for the polymer solid electrolyte has limitations in that it is difficult to prepare the polymer solid electrolyte with improved ionic conductivity due to the high crystallinity of the crystalline polymer or semi-crystalline polymer. In other words, the higher the crystallization degree of the polymer, the lower the mobility of the polymer chain. Accordingly, it was difficult to improve the ionic conductivity of the polymer solid electrolyte because there was a limitation in the movement of lithium ions inside the polymer solid electrolyte.

For example, conventional polymer solid electrolytes can be prepared by forming a coating film using polyvinyl alcohol (PVA) containing a hydroxyl group, which is a cross-linkable functional group, as a polymer, and then performing a high-temperature drying process. Specifically, after preparing a PVA aqueous solution by dissolving the PVA in water, the PVA aqueous solution is applied on a substrate by solution casting to form a coating film, and dried at room temperature or high temperature to form a polymer solid electrolyte in the form of a PVA film. At this time, the high temperature may mean 80° C. or higher, which is the glass transition temperature (Tg) of PVA. In the drying process, after the moisture evaporates, a hydrogen bond between the cross-linkable functional groups contained in the PVA is formed, and polymer chain folding occurs due to the hydrogen bond, and thus the crystallization degree of the polymer film increases. As the degree of crystallization increases, a polymer film with brittleness is formed. In polymer films with high degree of crystallization and brittleness, as the polymer chain mobility decreases, when there are dissociated ions inside the polymer film, a phenomenon in which the ionic mobility is also remarkably reduced occurs. For this reason, the general PVA film prepared by the high-temperature drying process after forming the coating film as described above exhibits properties that are not suitable as polymer solid electrolytes for lithium secondary batteries.

In order to overcome these limitations of conventional polymer solid electrolytes, a technique has been developed to improve the mobility of the polymer chain and improve the ionic conductivity of the polymer solid electrolyte by adding a plasticizer to a crystalline polymer or semi-crystalline polymer. However, when a plasticizer is used, it may be difficult to set process conditions because appropriate dispersibility and solubility (miscibility) between the polymer and the plasticizer must be secured. In addition, when a liquid plasticizer is applied, compatibility with the polymer is reduced, and it may be difficult to perform the preparation process of the polymer solid electrolyte.

Therefore, there is a demand for technology development that can improve the ionic conductivity of polymer solid electrolytes without additional additives such as plasticizers.

However, due to the absence of a polymer solid electrolyte, in which a correlation between the composition of the polymer solid electrolyte constituents and ionic conductivity is defined, and a technology for preparing such a polymer solid electrolyte, there are problems in that spec-in management of ionic conductivity is inefficient in a mass production system, and proper control is impossible when variables occur in a process condition.

RELATED ART

Chinese Patent Publication No. 112259788

SUMMARY

One of the objects of the present disclosure is to provide an ion polymer solid electrolyte in which ionic conductivity is improved, and a correlation between ionic conductivity and the constituents is established.

Another one of the objects of the present disclosure is to provide a method for preparing a polymer solid electrolyte with improved ionic conductivity, the method enabling mass production system build-up using a correlation between ionic conductivity and the constituents.

Still another one of the objects of the present disclosure is to provide an all-solid-state battery containing a polymer solid electrolyte with improved ionic conductivity.

In order to achieve the above objects, the present disclosure provides a polymer solid electrolyte including a polymer containing a cross-linkable functional group, a lithium salt, and a solvent, wherein the polymer solid electrolyte includes a cross-linked structure; and an amorphous polymer chain containing a cross-linkable functional group, the cross-linked structure includes (a) a cross-linkage between cross-linkable functional groups, (b) a cross-linkage between the cross-linkable functional group and the solvent, and (c) a bond between the cross-linkable functional group and the lithium salt, and the polymer solid electrolyte has ionic conductivity ($\sigma$), which is defined by the following Equation 1, of more than $10^{-8}$ S/cm:

$$\sigma = \sigma_0 (N - Nc)^s \quad \text{[Equation 1]}$$

wherein, $\sigma_0$ is maximum ionic conductivity that the polymer solid electrolyte is capable of exhibiting, N is a molar ratio ([Li]/[G]) of lithium (Li) of the lithium salt to the cross-linkable functional group ([G]) of the polymer, $N_C$ is a percolation threshold and $0<N_C\leq 0.15$, and S is a critical exponent and $1.9\leq S\leq 3.0$.

The present disclosure also provides a method for preparing a polymer solid electrolyte, the method including the steps of: (S1) forming a solution for forming a polymer solid electrolyte by adding a lithium salt to an aqueous solution of a polymer containing an oxygen-containing cross-linkable functional group; (S2) forming a coating film by applying the solution for forming a polymer solid electrolyte on a substrate; (S3) preparing a polymer solid electrolyte by freezing and thawing the coating film to form a physical cross-linkage of the polymer containing the cross-linkable functional group; (S4) measuring ionic conductivity of the polymer solid electrolyte; and (S5) adjusting the added amount of the lithium salt of the step (S1) by comparing the ionic conductivity measured in the step (S4) above and ionic conductivity calculated by the following Equation 1 such that the ionic conductivity ($\sigma$) calculated by the following Equation 1 is more than $10^{-8}$ S/cm:

$$\sigma = \sigma_0 (N - Nc)^s \quad \text{[Equation 1]}$$

wherein $\sigma_0$ is maximum ionic conductivity that the polymer solid electrolyte is capable of exhibiting, N is a molar ratio ([Li]/[G]) lithium (Li) of the lithium salt to the cross-linkable functional group ([G]) of the polymer, $N_C$ is a percolation threshold and $0<N_C\leq 0.15$, and S is a critical exponent and $1.9\leq S\leq 3.0$.

The present disclosure also provides an all-solid-state battery including the polymer solid electrolyte.

In a polymer solid electrolyte according to the present disclosure, crystallinity of the polymer is reduced due to a physical cross-linkage formed between cross-linkable functional groups included in the polymer containing a cross-linkable functional group, and accordingly, ionic conductivity can be improved.

In addition, compositions and added amounts of raw materials during the preparing process can be controlled depending on the ionic conductivity measured for the polymer solid electrolyte, which enables a mass production system build-up of the polymer solid electrolyte.

In addition, compositions and added amounts of raw materials during the preparing process can be controlled depending on the ionic conductivity measured for the polymer solid electrolyte, which enables a mass production system build-up of the polymer solid electrolyte.

DETAILED DESCRIPTION

Figure 1:
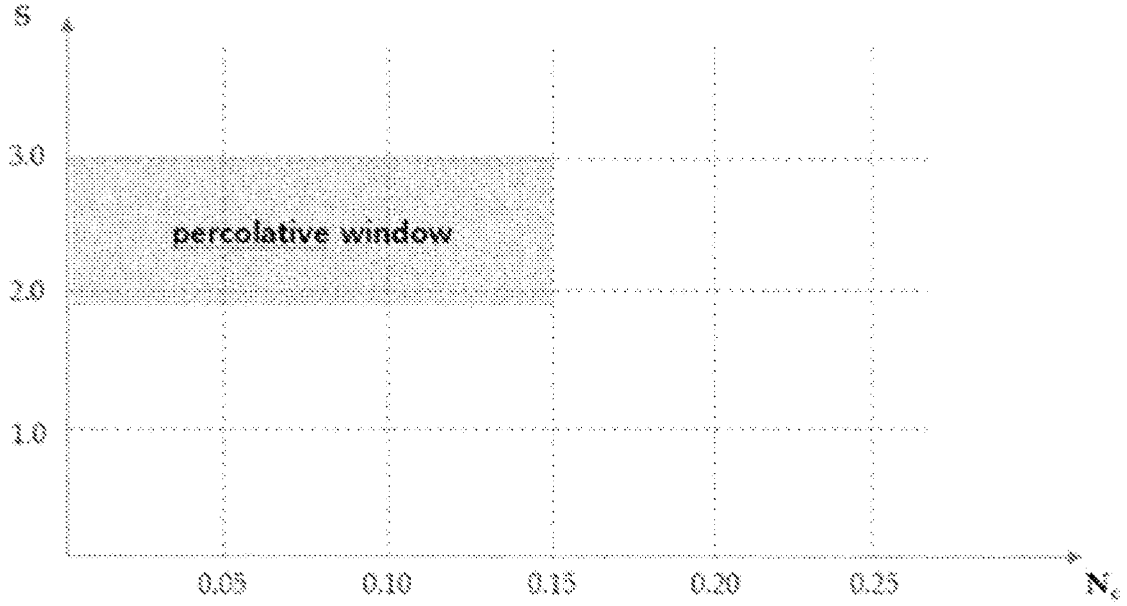
FIG. 1 is a graph illustrating a correlation between Nc (percolation threshold) and S (critical exponent) for a polymer solid electrolyte according to an embodiment of the present disclosure.

Hereinafter, the present disclosure will be described in more detail to help the understanding of the present disclosure.

The terms and words used in the present specification and claims should not be construed as limited to ordinary or dictionary terms, and should be construed in a sense and concept consistent with the technical idea of the present disclosure, based on the principle that the inventor can properly define the concept of a term to describe his disclosure in the best way possible.

As used herein, the term "cross-linked structure" refers to a structure including a three-dimensional frame formed by polymer chains and an internal space of the frame. The polymer chain may be formed by cross-linkages including cross-linkable functional groups contained in the polymer. Since the cross-linked structure has a three-dimensional shape and has a form in which polymer chains are entangled with each other, it can also be referred to as a three-dimensional network structure.

Polymer Solid Electrolyte

The present disclosure relates to a polymer solid electrolyte.

The polymer solid electrolyte according to the present disclosure is a polymer solid electrolyte including a polymer containing a cross-linkable functional group, a lithium salt, and a solvent, wherein the polymer solid electrolyte includes a cross-linked structure and an amorphous polymer chain containing the cross-linkable functional group, and the cross-linked structure includes (a) a cross-linkage between cross-linkable functional groups, (b) a cross-linkage between the cross-linkable functional group and the solvent, and (c) a bond between the cross-linkable functional group and the lithium salt. Specifically, the amorphous polymer chain and the lithium salt are included in an inner space formed in the cross-linked structure, and the lithium salt is included in a dissociated state.

In addition, the cross-linked structure may be formed in a freezing process as described later. In the freezing process, some of the cross-linkable functional groups contained in the polymer form localized crystallites, and the cross-linked structure may be formed by cross-linking the localized crystallites by acting as a cross-linkable junction point. In this case, the crystallite means a shape like a knot made by tangled threads, unlike a crystal structure formed by polymer chain folding.

In the present disclosure, the polymer solid electrolyte may have ionic conductivity ($\sigma$), which is defined by the following Equation 1, of more than $10^{-8}$ S/cm:

$$\sigma = \sigma_0 (N - Nc)^s \quad \text{[Equation 1]}$$

wherein $\sigma_0$ is maximum ionic conductivity that the polymer solid electrolyte can exhibit, N is a molar ratio ([Li]/[G]) of lithium (Li) of the lithium salt to the cross-linkable functional group ([G]) of the polymer, $N_C$ is a percolation threshold and $0<N_C\leq0.15$, and S is a critical exponent and $1.9\leq S\leq3.0$. In this case, the maximum ionic conductivity that the polymer solid electrolyte can exhibit means ionic conductivity in a state in which the polymer solid electrolyte has a complete structure without any defect.

The ionic conductivity ($\sigma$) of $10^{-8}$ S/cm or less may not be suitable to be used as an electrolyte for an all-solid-state battery. The ionic conductivity ($\sigma$) is advantageous as it increases within the above-mentioned range, however, when an excessive amount of salt is used to increase the ionic conductivity, properties of a gel are shown rather than properties of a solid, degrading mechanical properties of the electrolyte. An upper limit of the ionic conductivity ($\sigma$) is not particularly limited, but may be less than $10^{-3}$ S/cm. In general, a liquid electrolyte may have ionic conductivity of $10^{-3}$ S/cm to $10^{-2}$ S/cm.

In Equation 1 above, $\sigma_0$ may be a fitting parameter used when fitting the measured ionic conductivity with Equation 1.

In addition, when producing a hybrid-type material by mixing a dielectric substance with no conductive properties and a conductor with conductive properties, conductive properties of the hybrid material increase as the concentration of the conductor increases, and in this case, a percolation threshold refers to a minimum concentration of the conductor at which initial conductive properties are developed. For example, when molding a composite material having electrical conductivity by adding CNT to a polymer with no electrical conductivity, a minimum concentration of the CNT at which electrical conductivity properties first appear is the percolation threshold.

In the present disclosure, when attempting to develop ionic conductivity by adding a lithium salt to a polymer matrix with no ionic conductive properties at all, a threshold of a molar ratio ([Li]/[G]) of the lithium to the polymer cross-linkable functional group, at which ionic conductivity starts to be developed as a factor directly affecting the concentration percolation threshold of the lithium salt that starts to exhibit ionic conductivity, is defined as the percolation threshold (Nc).

In addition, when preparing a hybrid material based on a general percolation model, the degree of ionic conductivity development in the hybrid material may vary depending on conductive properties, shape, dimension and orientation of a conductor added to a dielectric substance, and as S, a critical exponent, increases, ionic conductivity tends to greatly increase. The lithium salt used as an ion conductor in the present disclosure may have different percolation properties depending on the degree of dissociation of the salt, interaction with the polymer matrix and bonding strength, and a cross-linked structure based on a physical cross-linkage through applying the freezing/thawing process according to the preparation method of the present disclosure, so that it is possible to prepare a polymer solid electrolyte having high ionic conductivity.

FIG. 1 is a graph illustrating a correlation between Nc and S for the polymer solid electrolyte according to an embodiment of the present disclosure.

Referring to FIG. 1, the polymer solid electrolyte belongs to a percolative window satisfying $0<N_C\leq0.15$ and $1.9\leq S\leq3.0$.

In the present disclosure, (a) the cross-linkage between cross-linkable functional groups may comprise a hydrogen bond between cross-linkable functional groups, and for example, the hydrogen bond may be a hydrogen bond between OH− groups.

If the cross-linked structure is formed only by the (a) cross-linkage between cross-linkable functional groups, crystallinity of the polymer solid electrolyte may be generated, and thus ionic conductivity may be reduced.

However, since the cross-linked structure comprise not only (a) the cross-linkage between cross-linkable functional groups, but also (b) the cross-linkage between the cross-linkable functional group and the solvent, and (c) the bond between the cross-linkable functional group and the lithium salt, the generation of crystallinity of the polymer solid electrolyte can be prevented.

In the present disclosure, (b) the cross-linkage between the cross-linkable functional group and the solvent may comprise a hydrogen bond, for example, the hydrogen bond may be a hydrogen bond between OH− and H+. At this time, H+ may be derived from a water solvent.

The cross-linkage (b) between the cross-linkable functional group and the solvent may mean a hydrogen bond between a part of the solvent remaining in the freezing and thawing processes and the cross-linkable functional group.

In addition, (b) the cross-linkage between the cross-linkable functional group and the solvent interferes with the cross-linkage between (a) the cross-linkable functional groups, so that the cross-linked structure does not consist only of the cross-linkage between (a) the cross-linkable functional groups, and thus the increase in crystallinity of the polymer solid electrolyte can be prevented.

In the present disclosure, (c) the bond between the cross-linkable functional group and the lithium salt may comprise a bond by Lewis acid-base interaction, and for example, the bond may be a bond between OH− and Li+.

The bond (c) between the cross-linkable functional group and the lithium salt is a bond by Lewis acid-base interaction, and may be a type of bond such as a metal-ligand bond.

In addition, (c) the bond between the cross-linkable functional group and the lithium salt interferes with (a) the cross-linkage between cross-linkable functional groups and (b) the cross-linkage between the cross-linkable functional group and the solvent, so that the cross-linked structure does not consist only of the cross-linkage between (a) the cross-linkable functional groups, and thus the generation of crystallinity of the polymer solid electrolyte can be prevented, and at the same time, the formation of amorphous polymer chains can be promoted. As the amorphous polymer chain is formed, the mobility of the polymer chain is improved, and thus the hopping effect of the lithium ion is increased, so that the ionic conductivity of the polymer solid electrolyte can be improved.

In the present disclosure, the amorphous polymer chain may also be formed in a freezing process as described later, and refers to a polymer chain that does not form crystals by regular folding of the polymer chain and exists in a free behavior state. That is, the amorphous polymer chain may include a polymer containing a cross-linkable functional group that does not form bonds as in (a), (b) and (c).

Due to the cross-linked structure, the polymer solid electrolyte is not easily broken or destroyed and thus can play a role as a support for an electrolyte containing lithium ions stably.

In addition, due to the amorphous polymer chain, since the polymer solid electrolyte exhibits elasticity, it can minimize brittleness, which is a property of being easily broken, and since the mobility of the polymer chain is excellent and the mobility of lithium ions inside the electrolyte is improved, the polymer solid electrolyte with improved ionic conductivity can be provided.

In the present disclosure, the cross-linkable functional group contained in the polymer containing the cross-linkable functional group may have a property capable of forming a cross-linked structure by forming bonds as in (a), (b) and (c) above.

For example, the cross-linkable functional group may include one or more selected from the group consisting of a hydroxyl group, a carboxyl group, and an amide group.

In addition, the weight average molecular weight (Mw) of the polymer containing the cross-linkable functional group may be 80,000 g/mol to 130,000 g/mol, and specifically, may be 80,000 g/mol or more, 83,000 g/mol or more or 85,000 g/mol or more, and 90,000 g/mol or less, 110,000 g/mol or less or 130,000 g/mol or less. If the weight average molecular weight (Mw) of the polymer containing the cross-linkable functional group is less than 80,000 g/mol, the bond by the cross-linkable functional group may not be sufficiently formed to obtain a cross-linked structure. If the weight average molecular weight (Mw) of the polymer containing the cross-linkable functional group exceeds 130,000 g/mol, the entanglement of the polymer chain is increased in the polymer solution used in the preparation process, and the penetration rate of the solvent into the polymer chain is decreased. Accordingly, gelation of the polymer is accelerated, and thus the solubility of the polymer is lowered and the bonding by the cross-linkable functional group cannot be performed smoothly, so the formation of a cross-linked structure may not be easy.

In addition, the polymer containing the cross-linkable functional group may have characteristic in that the bonds (a), (b) and (c) are well formed by the cross-linkable functional group contained in the phase separated polymer upon freezing because phase separation between the polymer and the solvent is smoothly performed in the polymer solution used in the preparation process.

For example, the polymer containing the cross-linkable functional group may include one or more selected from the group consisting of polyvinyl alcohol (PVA), gelatin, methylcellulose, agar, dextran, poly(vinyl pyrrolidone), poly(acryl amide), poly(acrylic acid) (PAA), starch-carboxymethyl cellulose, hyaluronic acid-methylcellulose, chitosan, poly(N-isopropylacrylamide) and amino-terminated polyethylene glycol (amino-terminated PEG). Preferably, the polymer containing the cross-linkable functional group may be PVA, and the PVA can be efficiently phase separated from the solvent upon freezing in the preparation process of the polymer solid electrolyte and it may be advantageous in forming a cross-linked structure by the bonds (a), (b) and (c) derived from the cross-linkable functional group of PVA phase separated from the solvent.

In the present disclosure, the lithium salt is included in a dissociated state in the inner space of the cross-linked structure, thereby improving the ionic conductivity of the polymer solid electrolyte.

In addition, the lithium salt can form (c) the bond between the cross-linkable functional group and the lithium salt, thereby preventing the generation of crystallinity of the polymer solid electrolyte and promoting the formation of an amorphous polymer chain at the same time.

The lithium salt may include one or more selected from the group consisting of $(CF_3SO_2)_2NLi$ (Lithium bis(trifluoromethanesulphonyl)imide, LiTFSI), $(FSO_2)_2NLi$ (Lithium bis(fluorosulfonyl)imide, LiFSI), $LiNO_3$, LiOH, LiCl, LiBr, LiI, $LiClO_4$, $LiBF_4$, $LiBiaCl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, chloroborane lithium, lower aliphatic carboxylic acid lithium, and lithium tetraphenylborate.

In the present disclosure, the molar ratio ([Li]/[G]) of the cross-linkable functional group ([G]) of the polymer containing the cross-linkable functional group and lithium ([Li]) of the lithium salt contained in the polymer solid electrolyte may be more than 0.1 and less than 0.5, and specifically may be more than 0.1, 0.2 or more, or 0.3 or more, and may be 0.4 or less, or 0.5 or less. If the molar ratio ([Li]/[G]) is 0.1 or less, as the content of the lithium salt is reduced, the ionic conductivity of the polymer solid electrolyte may be lowered. If the molar ratio ([Li]/[G]) is 0.5 or more, the content of the polymer containing the cross-linkable functional group is reduced, so that the bonds (a), (b) and (c) may not be sufficiently formed and thus crystallinity may be increased and ionic conductivity may be decreased. If the cross-linkable functional group is a hydroxyl group (OH−), the [G] may be expressed as [OH] or [O].

In the present disclosure, the polymer solid electrolyte may be in the form of a free-standing film or a coating layer. The free-standing film refers to a film capable of maintaining a film shape by itself without a separate support at room temperature and pressure. The coating layer means a layer obtained by coating on a substrate. If the polymer solid electrolyte is in the form of a coating layer, the coating layer may be in the form of a layer coated on an electrode.

The free-standing film or coating layer exhibits elasticity to minimize brittleness and has characteristics as a support that stably contains lithium ions, and thus it can be in a suitable form as a polymer solid electrolyte.

In the present disclosure, the polymer solid electrolyte may further include a liquid electrolyte, and by the liquid electrolyte, ionic conductivity of the polymer solid electrolyte may be further improved. The liquid electrolyte may also be included in an inner space of the cross-linked structure.

The liquid electrolyte may be a liquid electrolyte commonly used in the art, and the composition of the liquid electrolyte is not particularly limited as long as it is usable in a lithium secondary battery. For example, the liquid electrolyte may include a lithium salt and a non-aqueous solvent. The lithium salt may be one of the lithium salts described above. In addition, the non-aqueous solvent may include one or more types selected from the group consisting of propylene carbonate (PC), ethylene carbonate (EC), vinylene carbonate (VC), diethyl carbonate (DEC), dimethyl carbonate (DMC), methylethyl carbonate (MEC), ethylmethyl carbonate (EMC), tetrahydrofuran (THF), 2-methyltetrahydrofuran (2MeTHF), dioxolane (DOX), dimethoxyethane (DME), diethoxyethane (DEE), γ-butyrolactone (GBL), acetonitrile (AN) and sulfolane.

In addition, the liquid electrolyte may be included in an amount of 1% by weight to 5% by weight based on the total weight of the polymer solid electrolyte. When the liquid electrolyte content is 1% by weight or less, the effect of improving ionic conductivity may be insignificant, and when the content is greater than 5% by weight, stability may be reduced.

The polymer solid electrolyte as described above may be manufactured in a form including a cross-linked structure formed by the bonds such as (a), (b) and (c) formed by the cross-linkable functional group included in the polymer and an amorphous polymer chain including a polymer having a cross-linkable functional group with no cross-linked bond. Due to such morphological properties, the polymer solid electrolyte is capable of performing a role of a support stably containing lithium ions, minimizing brittleness by exhibiting elasticity, and improving ionic conductivity by preventing crystallinity from occurring.

Method for Manufacturing Polymer Solid Electrolyte

The present disclosure also relates to a method for preparing a polymer solid electrolyte, and the method includes the steps of: (S1) forming a solution for forming a polymer solid electrolyte by adding a lithium salt to an aqueous solution of a polymer containing an oxygen-containing cross-linkable functional group; (S2) forming a coating film by applying the solution for forming the polymer solid electrolyte on a substrate; (S3) freezing and thawing the coating film to form a physical cross-linkage of the polymer containing the cross-linkable functional group, preparing the polymer solid electrolyte; (S4) measuring ionic conductivity of the polymer solid electrolyte; and (S5) adjusting the added amount of the lithium salt of the step (S1) by comparing the ionic conductivity measured in the step (S4) above and ionic conductivity calculated by the following Equation 1 such that the ionic conductivity ($\sigma$) calculated by the following Equation 1 is more than $10^{-8}$ S/cm:

$$\sigma = \sigma_0 (N - Nc)^s \quad \text{[Equation 1]}$$

wherein $\sigma_0$ is maximum ionic conductivity that the polymer solid electrolyte can exhibit, N is a molar ratio ([Li]/[G]) of lithium (Li) of the lithium salt to the cross-linkable functional group ([G]) of the polymer, $N_C$ is a percolation threshold and $0<N_C\leq 0.15$, and S is a critical exponent and $1.9\leq S\leq 3.0$.

In the preparation method of the polymer solid electrolyte, the plasticizer used to reduce the crystallinity of the polymer is not added, and crystallization of the polymer can be prevented by inducing (a) a cross-linkage between cross-linkable functional groups, (b) a cross-linkage between the cross-linkable functional group and the solvent, and (c) a bond between the cross-linkable functional group and the lithium salt, by the cross-linkable functional group contained in the polymer through the freezing process, and as a result, the polymer solid electrolyte with improved ionic conductivity can be prepared.

Hereinafter, the method for preparing a polymer solid electrolyte according to the present disclosure will be described in detail for each step.

In the present disclosure, in the step (S1), a lithium salt may be added to a polymer solution containing a cross-linkable functional group to form a solution for forming a polymer solid electrolyte. Types and physical properties of the polymer including a cross-linkable functional group and the lithium salt are the same as described above.

The solvent used when preparing the polymer solution may be a polar solvent, and for example, may be water. In other words, the polymer solution may be an aqueous polymer solution.

The concentration of the solution of the polymer containing the cross-linkable functional group can be appropriately adjusted in consideration of the extent to which the coating process can proceed smoothly, when the solution for forming the polymer solid electrolyte is applied to the substrate. For example, the concentration of the solution of the polymer containing the cross-linkable functional group may be 5% to 20%, and specifically may be 5% or more, 7% or more or 9% or more, and may be 13% or less, 17% or less or 20% or less. If the concentration of the solution of the polymer containing the cross-linkable functional group is less than 5%, the concentration is too dilute and thus it may flow down when applied on the substrate. If the concentration of the solution of the polymer containing the cross-linkable functional group exceeds 20%, it is difficult to dissolve the lithium salt at a desired concentration in the solution of the polymer, and it may be difficult to apply it in the form of a uniform thin film due to its high viscosity.

In the present disclosure, in step (S2) above, a coating film may be formed by applying the solution for forming the polymer solid electrolyte on the substrate.

The substrate is not particularly limited as long as it can serve as a support on which the solution for forming the polymer solid electrolyte is applied. For example, the substrate may be stainless steel (SS), a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film, or a polyimide film.

In addition, the coating method is not particularly limited as long as it is a method capable of applying the solution for forming the polymer solid electrolyte in the form of a film on the substrate. For example, the coating method may be bar coating, roll coating, spin coating, slit coating, die coating, blade coating, comma coating, slot die coating, lip coating or solution casting.

In the present disclosure, in step (S3) above, the coating film may be frozen and thawed to form a cross-linked structure. In other words, in the freezing process, the bond of (a), (b) and (c) above is induced by the cross-linkable functional group to form a cross-linked structure, and an amorphous polymer chain may be formed.

In the freezing process, the polymer and water contained in the aqueous solution of the polymer containing the cross-linkable functional group used to form the coating film may be phase separated. The phase separation may be induced because the strength of the hydrogen bond between the water molecules is stronger than that between the cross-linkable functional group and the water molecules. Water molecules aggregated by hydrogen bonds between the water molecules exist in the ice phase by a freezing process. As a result, the number of cross-linkable functional groups forming hydrogen bonds through interaction with the water molecules is significantly reduced.

In other words, in the freezing process of the coating film, the polymer and water included in the aqueous polymer solution need to be phase separated first, and the phase separation may be induced by hydrogen bonds between the water molecules.

Due to the phase separation, the inside of the coating film is divided into (i) a polymer-poor phase and (ii) a polymer-rich phase.

The (i) polymer-poor phase is a portion containing water molecules aggregated by hydrogen bonds between water molecules and exists as an ice phase, which can also be referred to as a free water state.

The (ii) polymer-rich phase is a portion containing a polymer phase separated from water. The phase-separated polymer is a polymer containing a cross-linkable functional group that is free from interaction with water molecules, and is in a free state after phase separation, does not form crystals by regular folding, and exists in an amorphous state with relatively free behavior, which is called an amorphous polymer chain.

In addition, some of the cross-linkable functional groups contained in the phase separated polymer form localized crystallites. The localized crystallites act as a cross-linkable junction point to form a cross-linked structure including bonds (a), (b) and (c) above.

In addition, in the thawing process after the freezing process, the ice contained in the (i) polymer-poor phase melts and evaporates, and thus a polymer solid electrolyte with an increased free volume can be prepared.

In addition, the freezing may be performed by appropriately selecting conditions sufficient to freeze the coating film. For example, the freezing may be performed at a temperature of −30° C. to −10° C., and specifically, the freezing temperature may be −30° C. or higher, −25° C. or higher, or −23° C. or higher, and may be −18° C. or lower, −15° C. or lower or −10° C. or lower. If the freezing temperature is less than −30° C., cracks may occur in the coating film. If the freezing temperature exceeds −10° C., formation of regions of amorphous polymer chains can be difficult because sufficient phase separation between the polymer and water is not achieved. In addition, the freezing may be performed in consideration of a sufficient freezing time within the range of 20 hours to 30 hours.

In addition, the thawing can be performed by appropriately selecting conditions capable of thawing to the extent that the frozen coating film can be applied as a polymer solid electrolyte. For example, the thawing temperature may be 15° C. to 35° C. or may be room temperature (25° C.). If the thawing temperature is less than 15° C., moisture drying efficiency may decrease after thawing (ice melting). If the thawing temperature exceeds 35° C., the coating film may shrink and thus cause wrinkles or warping.

After the step (S3), a process of loading the polymer solid electrolyte into a liquid electrolyte, or drying after the loading may be further included. The composition and the content of the liquid electrolyte are the same as described above.

In the present disclosure, in the step (S4), ionic conductivity of the polymer solid electrolyte may be measured.

The ionic conductivity may be measured with an electrochemical impedance spectroscopy (EIS).

In the present disclosure, in the step (S5), the added amount of the lithium salt of the step (S1) may be adjusted by comparing the ionic conductivity measured in the step (S4) and ionic conductivity calculated by the following Equation 1 such that the ionic conductivity (σ) calculated by the following Equation 1 is more than $10^{-8}$ S/cm:

$$\sigma = \sigma_0 (N - Nc)^s \quad \text{[Equation 1]}$$

wherein $\sigma_0$ is maximum ionic conductivity that the polymer solid electrolyte can exhibit, N is a molar ratio ([Li]/[G]) of lithium (Li) of the lithium salt to the cross-linkable functional group ([G]) of the polymer, $N_C$ is a percolation threshold and $0<N_C\leq 0.15$, and S is a critical exponent and $1.9\leq S\leq 3.0$.

Ionic conductivity of the polymer solid electrolyte may be defined by Equation 1 as described above. Accordingly, if the ionic conductivity measured in the step (S4) is smaller than the ionic conductivity specified in Equation 1, the added amount of the lithium salt may be increased in the step (S1), and if the ionic conductivity measured in the step (S4) is larger than the ionic conductivity specified in Equation 1, the added amount of the lithium salt may be decreased in the step (S1).

All-Solid-State Battery

The present disclosure also relates to an all-solid-state battery including the polymer solid electrolyte, wherein the all-solid-state battery comprises a negative electrode, a positive electrode, and a polymer solid electrolyte interposed between the negative electrode and the positive electrode, and the solid electrolyte has the above-described characteristics.

Specifically, the polymer solid electrolyte may be suitable as an electrolyte for an all-solid-state battery because physical cross-linkage is formed through the freezing and thawing processes and thus crystallinity is lowered, and ionic conductivity is improved accordingly.

In the present disclosure, the positive electrode contained in the all-solid-state battery includes a positive electrode active material layer, and the positive electrode active material layer may be formed on one surface of the positive electrode current collector.

The positive electrode active material layer includes a positive electrode active material, a binder, and a conductive material.

In addition, the positive electrode active material is not particularly limited as long as it is a material capable of reversibly intercalating and de-intercalating lithium ions, and for example, may be, but is not limited to, layered compounds or compounds substituted with one or more transition metals, such as lithium cobalt oxide ($LiCoO_2$), lithium nickel oxide ($LiNiO_2$), $Li[Ni_xCo_yMn_zM_v]O_2$ (wherein, M is any one or two or more elements selected from the group consisting of Al, Ga and In; $0.3\leq x<1.0$, $0\leq y$, $z\leq 0.5$, $0\leq v\leq 0.1$, $x+y+z+v=1$), $Li(Li_aM_{b-a-b'}M'_{b'})O_{2-c}A_c$ (wherein, $0\leq a\leq 0.2$, $0.6\leq b\leq 1$, $0\leq b'\leq 0.2$, $0\leq c\leq 0.2$; M comprises Mn and one or more selected from the group consisting of Ni, Co, Fe, Cr, V, Cu, Zn and Ti; M' is one or more selected from the group consisting of Al, Mg and B, and A is one or more selected from the group consisting of P, F, S and N); lithium manganese oxide such as Formula $Li_{1+y}Mn_{2-y}O_4$ (wherein, y is 0-0.33), $LiMnO_3$, $LiMn_2O_3$, $LiMnO_2$; lithium copper oxide ($Li_2CuO_2$); vanadium oxide such as $LiV_3O_8$, $LiFe_3O_4$, $V_2O_5$, $Cu_2V_2O_7$; Ni site type lithium nickel oxide represented by Formula $LiNi_{1-y}MyO_2$ (wherein, M=Co, Mn, Al, Cu, Fe, Mg, B or Ga, y=0.01-0.3); lithium manganese composite oxide represented by Formula $LiMn_{2-y}M_yO_2$ (wherein, M=Co, Ni, Fe, Cr, Zn or Ta, y=0.01-0.1) or $Li_2Mn_3MO_8$ (wherein, M=Fe, Co, Ni, Cu or Zn); $LiMn_2O_4$ in which part of Li in the Formula is substituted with alkaline earth metal ions; disulfide compounds; and $Fe_2(MoO_4)_3$.

In addition, the positive electrode active material may be contained in an amount of 40 to 80% by weight based on the total weight of the positive electrode active material layer. Specifically, the content of the positive electrode active material may be 40% by weight or more or 50% by weight or more, and may be 70% by weight or less or 80% by weight or less. If the content of the positive electrode active material is less than 40% by weight, the connectivity between the wet positive electrode active material layer and the dry positive electrode active material layer may be insufficient. If the content of the positive electrode active material exceeds 80% by weight, mass transfer resistance may be increased.

In addition, the binder is a component that assists bonding between the positive electrode active material and the conductive material, and assists in bonding to the current collector. The binder may comprise one or more selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acrylic rubber, butyl rubber, fluorine rubber, polytetrafluoroethylene, polyethylene, polypropylene, ethylene/propylene copolymer, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resin, phenolic resin, epoxy resin, carboxymethylcellulose, hydroxypropyl cellulose, cellulose acetate, cellulose acetate butyrate, cellulose acetate propionate, cyanoethyl cellulose, cyanoethyl sucrose, polyester, polyamide, polyether, polyimide, polycarboxylate, polycarboxylic acid, polyacrylic acid, polyacrylate, lithium polyacrylate, polymethacrylic acid, polymethacrylate, polyacrylamide, polyurethane, polyvinylidene fluoride, and poly(vinylidene fluoride)-hexafluoropropene. Preferably, the binder may comprise one or more selected from the group consisting of styrene-butadiene rubber, polytetrafluoroethylene, carboxymethyl cellulose, polyacrylic acid, lithium polyacrylate, and polyvinylidene fluoride.

In addition, the binder may be contained in an amount of 1% by weight to 30% by weight based on the total weight of the positive electrode active material layer, and specifically, the content of the binder may be 1% by weight or more or 3% by weight or more, and may be 15% by weight or less or 30% by weight or less. If the content of the binder is less than 1% by weight, the adhesive force between the positive electrode active material and the positive electrode current collector may be lowered. If the content of the binder exceeds 30% by weight, the adhesive force is improved, but the content of the positive electrode active material is reduced by that amount, and thus the capacity of the battery may be lowered.

In addition, the conductive material is not particularly limited as long as it prevents side reactions in the internal environment of the all-solid-state battery and has excellent electrical conductivity without causing chemical changes in the battery. The conductive material may be typically graphite or conductive carbon, and for example, graphite such as natural graphite, artificial graphite; carbon black such as carbon black, acetylene black, Ketjen black, Denka black, thermal black, channel black, furnace black, lamp black, thermal black; carbon-based materials whose crystal structure is graphene or graphite; conductive fibers such as carbon fibers and metal fibers; carbon fluoride; metal powders such as aluminum powder and nickel powder; conductive whiskers such as zinc oxide and potassium titanate; conductive oxides such as titanium oxide; and conductive polymers such as polyphenylene derivatives may be used alone or in combination of two or more thereof as the conductive material, but is not necessarily limited thereto.

The conductive material may be generally contained in an amount of 0.5% by weight to 30% by weight based on the total weight of the positive electrode active material layer, and specifically, the content of the conductive material may be 0.5% by weight or more or 1% by weight or more, and may be 20% by weight or less or 30% by weight or less. If the content of the conductive material is too small, i.e., less than 0.5% by weight, it is difficult to expect an effect of improving electrical conductivity or the electrochemical properties of the battery may be deteriorated. If the content of the conductive material exceeds 30% by weight and thus is too large, the amount of the positive electrode active material may be relatively small, so that the capacity and energy density may be lowered. A method for incorporating the conductive material to the positive electrode is not particularly limited, and a conventional method known in the art, such as coating on the positive electrode active material, may be used.

In addition, the positive electrode current collector supports the positive electrode active material layer, and serves to transfer electrons between the external conductive wire and the positive electrode active material layer.

The positive electrode current collector is not particularly limited as long as it has high electrical conductivity without causing chemical changes in the all-solid-state battery. For example, as the positive electrode current collector, copper, stainless steel, aluminum, nickel, titanium, palladium, sintered carbon; a copper or stainless steel surface-treated with carbon, nickel, silver, etc.; an aluminum-cadmium alloy, etc. may be used.

The positive electrode current collector may have a fine irregularity structure on the surface of the positive electrode current collector or have a three-dimensional porous structure, in order to strengthen the bonding force with the positive electrode active material layer. Accordingly, the positive electrode current collector may comprise various forms such as a film, a sheet, a foil, a mesh, a net, a porous body, a foam, and a non-woven fabric.

The positive electrode as described above may be prepared by the conventional method, and specifically, the positive electrode is manufactured by coating and drying a composition for forming the positive electrode active material layer prepared by mixing the positive electrode active material, the conductive material and the binder in an organic solvent, onto the positive electrode current collector, and optionally compression-molding it onto the current collector to improve the electrode density. At this time, as the organic solvent, it is preferable to use one that can uniformly disperse the positive electrode active material, the binder, and the conductive material and that evaporates easily. Specifically, acetonitrile, methanol, ethanol, tetrahydrofuran, water, isopropyl alcohol and the like are exemplified.

In the present disclosure, the negative electrode comprised in the all-solid-state battery comprises an negative electrode active material layer, and the negative electrode active material layer may be formed on one surface of the negative electrode current collector.

The negative electrode active material may be a material capable of reversibly intercalating or de-intercalating lithium ion ($Li^+$), a material capable of reacting with lithium ion to reversibly form a lithium-containing compound, lithium metal or a lithium alloy.

The material capable of reversibly intercalating or de-intercalating lithium ion ($Li^+$) may be, for example, crystalline carbon, amorphous carbon or mixtures thereof. The material capable of reacting with the lithium ion ($Li^+$) to reversibly form a lithium-containing compound may be, for example, tin oxide, titanium nitrate, or silicon. The lithium alloy may be, for example, an alloy of lithium (Li) and the metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

Preferably, the negative electrode active material may be lithium metal, and specifically, may be in the form of a lithium metal thin film or lithium metal powder.

The negative electrode active material may be contained in an amount of 40 to 80% by weight based on the total weight of the negative electrode active material layer. Specifically, the content of the negative electrode active material may be 40% by weight or more or 50% by weight or more, and may be 70% by weight or less or 80% by weight or less. If the content of the negative electrode active material is less than 40% by weight, the connectivity between the wet negative electrode active material layer and the dry negative electrode active material layer may be insufficient. If the content of the negative electrode active material exceeds 80% by weight, mass transfer resistance may be increased.

In addition, the binder is the same as described above for the positive electrode active material layer.

In addition, the conductive material is the same as described above for the positive electrode active material layer.

In addition, the negative electrode current collector is not particularly limited as long as it has conductivity without causing chemical change in the battery, and for example, the negative electrode current collector may be copper, stainless steel, aluminum, nickel, titanium, sintered carbon; copper or stainless steel surface-treated with carbon, nickel, titanium, silver, etc.; or aluminum-cadmium alloy. In addition, the negative electrode current collector may be used in various forms, such as a film having fine irregularity on its surface, a sheet, a foil, a net, a porous body, a foam, and a non-woven fabric, as in the positive electrode current collector.

The manufacturing method of the negative electrode is not particularly limited, and may be manufactured by forming an negative electrode active material layer on an negative electrode current collector using a layer or film formation method commonly used in the art. For example, a method such as pressing, coating, or vapor deposition may be used. Also, a case where a thin film of a metal lithium is formed on a metal plate by initial charging after assembling the battery without a lithium thin film on the negative electrode current collector is also included in the negative electrode of the present disclosure.

In addition, the present disclosure provides a battery module comprising the all-solid-state battery as a unit cell, a battery pack comprising the battery module, and a device comprising the battery pack as a power source.

In this case, examples of the above device may comprise, but are not limited to, a power tool powered by an electric motor; electric cars including an electric vehicle (EV), a hybrid electric vehicle (HEV), a plug-in hybrid electric vehicle (PHEV), and the like; electric motorcycles including an electric bike (E-bike) and an electric scooter (E-scooter); an electric golf cart; and a power storage system. Hereinafter, preferred examples are presented to aid understanding of the present disclosure, but the following examples are only illustrative of the present disclosure, and it will be apparent to those skilled in the art that various changes and modifications can be made within the scope and technical idea of the present disclosure, and also it is natural that such variations and modifications are within the scope of the appended claims.

In the following Examples and Comparative Examples, polymer solid electrolytes were prepared depending on the inclusion of the cross-linkable functional group, the type of the polymer containing the cross-linkable functional group, the molar ratio between the cross-linkable functional group and the lithium ion, and the use of freezing/thawing process, as described in the following Table 1.

TABLE 1

| | Name | Weight Average Molecular Weight (Mw, g/mol) | Molar Ratio between Cross-Linkable Functional Group and Lithium ([Li]/[OH]) | |
|---|---|---|---|---|
| Example 1 | PVA | 89,000 | 0.1 | Used |
| Example 2 | PVA | 89,000 | 0.2 | Used |
| Example 3 | PVA | 89,000 | 0.3 | Used |
| Example 4 | PVA | 89,000 | 0.4 | Used |
| Example 5 | PVA | 89,000 | 0.5 | Used |
| Comparative Example 1 | PVA | 89,000 | 0.1 | Not Used (Dried at Room Temperature, 25° C.) |
| Comparative Example 2 | PVA | 89,000 | 0.2 | Not Used (Dried at Room Temperature, 25° C.) |
| Comparative Example 3 | PVA | 89,000 | 0.3 | Not Used (Dried at Room Temperature, 25° C.) |
| Comparative Example 4 | PVA | 89,000 | 0.4 | Not Used (Dried at Room Temperature, 25° C.) |
| Comparative Example 5 | PVA | 89,000 | 0.5 | Not Used (Dried at Room Temperature, 25° C.) |

Example 1

PVA (Mw: 89,000 g/mol; degree of hydrolysis: >99%) was mixed with water to prepare a 10% PVA aqueous solution. LiTFSI was added to the PVA aqueous solution, and then stirred to prepare a solution containing PVA, which is a polymer having a cross-linkable functional group, and LiTFSI, which is a lithium salt. At this time, the molar ratio ([Li]/[OH]) of "OH", the cross-linkable functional group of the PVA, and "Li" of the lithium salt was set to 0.1.

The solution was applied on SS foil, which is a substrate, by a bar coating method to form a coating film, and then, it was frozen at −20° C. for 24 hours and thawed at 25° C. to prepare a polymer solid electrolyte.

Example 2

A polymer solid electrolyte was prepared in the same manner as in Example 1, except that "O" contained in the cross-linkable functional group of the PVA and "Li" included in the lithium salt were set to have a molar ratio ([Li]/[O]) of 0.2.

Example 3

A polymer solid electrolyte was prepared in the same manner as in Example 1, except that "O" contained in the cross-linkable functional group of the PVA and "Li" contained in the lithium salt were set to have a molar ratio ([Li]/[O]) of 0.3.

Example 4

A polymer solid electrolyte was manufactured in the same manner as in Example 1, except that "O" contained in the cross-linkable functional group of the PVA and "Li" contained in the lithium salt were employed to have a molar ratio ([Li]/[O]) of 0.4.

Example 5

A polymer solid electrolyte was prepared in the same manner as in Example 1, except that "O" contained in the cross-linkable functional group of the PVA and "Li" contained in the lithium salt were set to have a molar ratio ([Li]/[O]) of 0.5.

Comparative Example 1

A polymer solid electrolyte was prepared in the same manner as in Example 1, except that a solution containing PVA, which is a polymer with a cross-linkable functional group, and LiTFSI, which is a lithium salt, was coated on SS foil, which is a substrate, and then dried at room temperature (25° C.).

Comparative Example 2

A polymer solid electrolyte was prepared in the same manner as in Example 2, except that a solution containing PVA, which is a polymer with a cross-linkable functional group, and LiTFSI, which is a lithium salt, was coated on SS foil, which is a substrate, and then dried at room temperature (25° C.).

Comparative Example 3

A polymer solid electrolyte was prepared in the same manner as in Example 3, except that a solution containing PVA, which is a polymer with a cross-linkable functional group, and LiTFSI, which is a lithium salt, was coated on SS foil, which is a substrate, and then dried at room temperature (25° C.).

Comparative Example 4

A polymer solid electrolyte was prepared in the same manner as in Example 4, except that a solution containing PVA, which is a polymer with a cross-linkable functional group, and LiTFSI, which is a lithium salt, was coated on SS foil, which is a substrate, and then dried at room temperature (25° C.).

Comparative Example 5

A polymer solid electrolyte was prepared in the same manner as in Example 5, except that a solution containing PVA, which is a polymer with a cross-linkable functional group, and LiTFSI, which is a lithium salt, was coated on SS foil, which is a substrate, and then dried at room temperature (25° C.).

Experimental Example 1

In order to measure the ionic conductivity of the polymer solid electrolytes in the form of films prepared in Examples and Comparative Examples, the polymer solid electrolyte was punched out in a circular shape with a size of 1.7671 $cm^2$, and the punched polymer solid electrolyte was placed between two sheets of stainless steel (SS) to prepare a coin cell.

Using an electrochemical impedance spectrometer (EIS, VM3, Bio Logic Science Instrument), the resistance was measured under conditions of an amplitude of 10 mV and a scan range of 500 KHz to 20 MHz at 25° C., and then, using Equation 2 below, the ionic conductivity of the polymer solid electrolyte was calculated.

$$\sigma_j = \frac{L}{RA} \quad \text{[Equation 2]}$$

wherein, σi is the ionic conductivity (S/cm) of the polymer solid electrolyte, R is the resistance (Ω) of the polymer solid electrolyte measured by the electrochemical impedance spectrometer, L is the thickness (μm) of the polymer solid electrolyte, and A is the area($cm^2$) of the polymer solid electrolyte.

If the ionic conductivity of the measured polymer solid electrolyte was smaller than the ionic conductivity value specified in the following Equation 1, the added amount of the lithium salt was increased, and when larger, the added amount of the lithium salt was decreased.

$$\sigma = \sigma_0 (N - Nc)^s \quad \text{[Equation 1]}$$

wherein, $\sigma_0$ is maximum ionic conductivity that the polymer solid electrolyte can exhibit, N is a molar ratio ([Li]/[G]) of lithium (Li) of the lithium salt to the cross-linkable functional group ([G]) of the polymer, $N_C$ is a percolation threshold and $0<N_C\leq 0.15$, and S is a critical exponent and $1.9\leq S\leq 3.0$.

Figure 2:
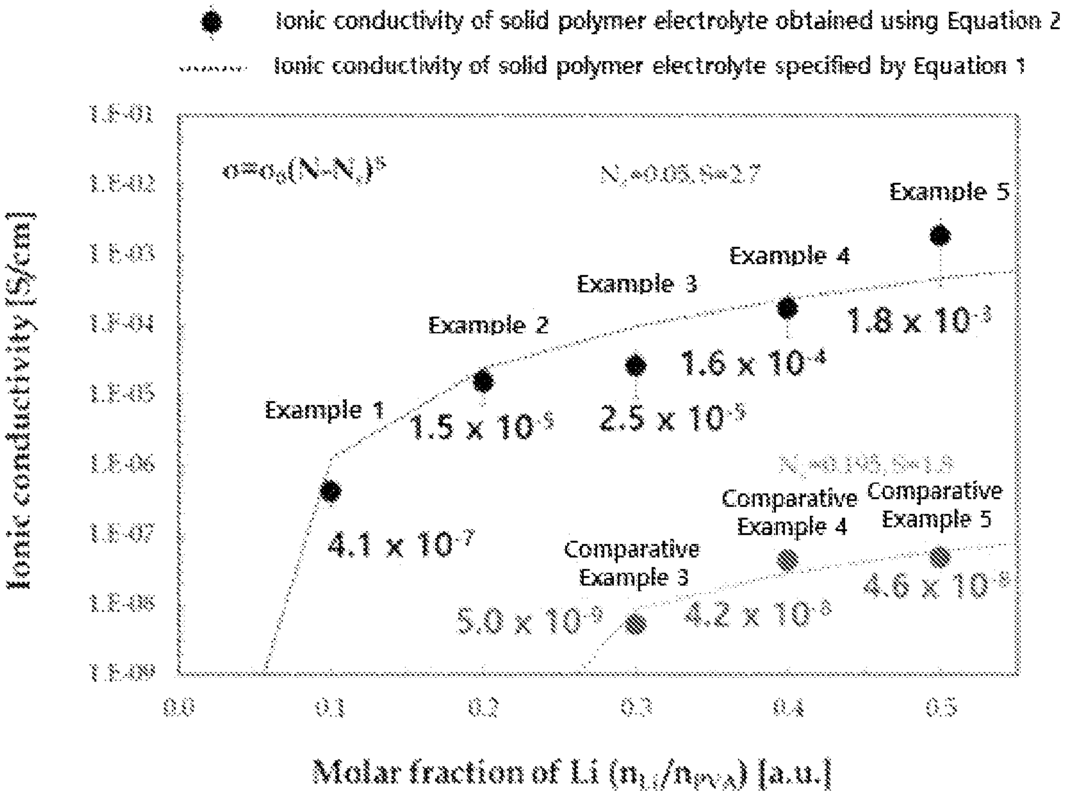
FIG. 2 illustrates results of ionic conductivity measured by Equation 2 and results of fitting by Equation 1 in Experimental Example 1.

FIG. 2 is a graph illustrating ionic conductivity ($\sigma_i$) of the polymer solid electrolyte obtained by Equation 2 and ionic conductivity (σ) specified by Equation 1 in Experimental Example 1.

Referring to FIG. 2, it was confirmed that, regarding the polymer solid electrolytes obtained in the Examples and the Comparative Examples, ionic conductivity ($\sigma_i$) of the polymer solid electrolyte obtained by Equation 2 was smaller or larger than ionic conductivity (σ) of the polymer solid electrolyte specified by Equation 1.

Accordingly, by increasing the added amount of the lithium salt when ionic conductivity ($\sigma_i$) of the polymer solid electrolyte obtained by Equation 2 is smaller than ionic conductivity (σ) of the polymer solid electrolyte specified by Equation 1, and decreasing the added amount of the lithium salt when larger, ionic conductivity ($\sigma_i$) of the polymer solid electrolyte may be fitted to fall within the range of ionic conductivity (σ) of the polymer solid electrolyte specified by Equation 1.

TABLE 2

| | Ionic Conductivity (S/cm) | Remarks |
|---|---|---|
| Example 1 | $4.1 \times 10^{-7}$ | — |
| Example 2 | $1.5 \times 10^{-5}$ | — |
| Example 3 | $2.5 \times 10^{-5}$ | — |
| Example 4 | $1.6 \times 10^{-4}$ | — |
| Example 5 | $1.8 \times 10^{-3}$ | Ionic conductivity is high, but gel form instead of film state |
| Comparative Example 1 | — | Brittle film |
| Comparative Example 2 | — | Brittle film |
| Comparative Example 3 | $5.0 \times 10^{-9}$ | — |
| Comparative Example 4 | $4.2 \times 10^{-8}$ | — |
| Comparative Example 5 | $4.6 \times 10^{-8}$ | — |

As shown in Table 2, as a result of preparing a polymer solid electrolyte through freezing and thawing processes using a polymer containing a cross-linkable functional group as a raw material, and preparing a polymer solid electrolyte by controlling the added amount of a lithium salt used depending on the ionic conductivity value of the prepared polymer solid electrolyte, a polymer solid electrolyte having high ionic conductivity value could be prepared.

In the above, although the present disclosure has been described by way of limited embodiments and drawings, the present disclosure is not limited thereto, and it is apparent to those skilled in the art that various modifications and variations can be made within the equivalent scope of the technical idea of the present disclosure and the claims to be described below.

The invention claimed is:

1. A polymer solid electrolyte comprising:

a polymer containing a cross-linkable functional group;

a lithium salt; and a solvent, wherein the polymer solid electrolyte comprises a cross-linked structure;, and an amorphous polymer chain containing the cross-linkable functional group, the cross-linked structure contains (a) a cross-linkage between cross-linkable functional groups, (b) a cross-linkage between the cross-linkable functional group and the solvent, and (c) a bond between the cross-linkable functional group and the lithium salt, the polymer solid electrolyte has ionic conductivity (σ), which is defined by the following Equation 1, of more than $10^8$ S/cm:

$$\sigma = \sigma_0(N - Nc)^S \quad \text{[Equation 1]}$$

wherein σ0 is a maximum ionic conductivity that the polymer solid electrolyte can exhibit, N is a molar ratio ([Li]/[G]) of lithium (Li) of the lithium salt to the cross-linkable functional group ([G]) of the polymer, $N_C$ is a percolation threshold and $0<Nc\leq 0.15$, and S is a critical exponent and $1.9\leq S\leq 3.0$.

2. The polymer solid electrolyte according to claim 1, wherein (a) the cross-linkage between cross-linkable functional groups comprises a hydrogen bond, (b) the cross-linkage between the cross-linkable functional group and the solvent comprises a hydrogen bond, and (c) the bond between the cross-linkable functional group and the lithium salt comprises a bond by Lewis acid-base interaction.

3. The polymer solid electrolyte according to claim 1, wherein the cross-linkable functional group comprises one or more selected from the group consisting of a hydroxyl group, a carboxyl group, and an amide group.

4. The polymer solid electrolyte according to claim 1, wherein the polymer containing the cross-linkable functional group has a weight average molecular weight (Mw) of 80,000 g/mol to 130,000 g/mol.

5. The polymer solid electrolyte according to claim 1, wherein the polymer containing the cross-linkable functional group comprises one or more selected from the group consisting of polyvinyl alcohol (PVA), gelatin, methyl cellulose, agar, dextran, poly(vinyl pyrrolidone), poly(ethylene oxide), poly(acrylamide), starch-carboxymethyl cellulose, hyaluronic acid-methylcellulose, chitosan, poly(N-isopropylacrylamide), and amino-terminated polyethylene glycol (PEG).

6. The polymer solid electrolyte of claim 1, wherein the lithium salt comprises one or more selected from the group consisting of $(CF_3SO_2)_2NLi$ (lithium bis(trifluoromethanesulfonyl)imide, LiTFSI), $(FSO_2)_2NLi$ (lithium bis(fluorosulfonyl)imide, LiFSI), $LiNO_3$, LiOH, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, chloroborane lithium, lower aliphatic carboxylic acid lithium, and lithium tetraphenylborate.

7. The polymer solid electrolyte of claim 1, wherein the molar ratio ([Li]/[G]) of lithium ([Li]) of the lithium salt to the cross-linkable functional group ([G]) of the polymer is more than 0.1 and less than 0.5.

8. The polymer solid electrolyte of claim 1, wherein the polymer solid electrolyte is in the form of a free-standing film or a coating layer.

9. The polymer solid electrolyte of claim 1, wherein the polymer solid electrolyte further comprises a liquid electrolyte.

10. A method for preparing a polymer solid electrolyte, the method comprising:

(S1) forming a solution by adding a lithium salt to an aqueous solution of a polymer containing an oxygen-containing cross-linkable functional group;

(S2) forming a coating film by applying the solution on a substrate;

(S3) preparing a polymer solid electrolyte by freezing and thawing the coating film to form a physical cross-linkage of the polymer containing the cross-linkable functional group;

(S4) measuring ionic conductivity of the polymer solid electrolyte; and (S5) adjusting the added amount of the lithium salt of the step (S1), by comparing the ionic conductivity measured in the step (S4) and ionic conductivity calculated by the following Equation 1 such that the ionic conductivity (σ) calculated by the following Equation 1 is more than $10^{-8}$ S/cm:

$$\sigma = \sigma_0(N - Nc)^S \quad \text{[Equation 1]}$$

wherein $\sigma_0$ is maximum ionic conductivity that the polymer solid electrolyte can exhibit, N is a molar ratio ([Li]/[G]) between of lithium (Li) of the lithium salt to the cross-linkable functional group ([G]) of the polymer, $N_C$ is a percolation threshold and $0<N_C\leq 0.15$, and S is a critical exponent and $1.9\leq S\leq 3.0$.

11. The method of claim 10, wherein the freezing is performed at −30° C. to −10° C.

12. The method of claim 10, wherein the thawing is performed at 15° C. to 35° C.

13. An all-solid-state battery comprising the polymer solid electrolyte of claims 1.

* * * * *